(12) United States Patent
Kalisz

(10) Patent No.: US 8,448,985 B2
(45) Date of Patent: May 28, 2013

(54) ACTIVE BOLSTER WITH DOUBLE-HINGED TETHER TABS

(75) Inventor: Raymond E. Kalisz, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 13/179,804

(22) Filed: Jul. 11, 2011

(65) Prior Publication Data

US 2013/0015647 A1    Jan. 17, 2013

(51) Int. Cl.
*B60R 21/216* (2011.01)
*B60R 21/2338* (2011.01)
*B60R 21/206* (2011.01)

(52) U.S. Cl.
USPC ........ 280/752; 280/753; 280/743.2; 280/732; 296/70

(58) Field of Classification Search
USPC .............. 280/752, 753, 751, 748, 743.2, 732, 280/730.1, 728.1, 730.2; 296/70
IPC .......... B60R 21/215,21/216, 21/2238, 21/2334, B60R 21/045, 21/205, 21/206, 21/231, 21/23, B60R 21/16, 21/2155
See application file for complete search history.

(56) References Cited

U.S. PATENT DOCUMENTS

| | | | |
|---|---|---|---|
| 5,536,043 A | 7/1996 | Lang et al. | |
| 5,931,493 A * | 8/1999 | Sutherland | 280/730.1 |
| 6,032,978 A | 3/2000 | Spencer et al. | |
| 6,039,380 A * | 3/2000 | Heilig et al. | 296/70 |
| 6,131,950 A * | 10/2000 | Schroter | 280/753 |
| 6,170,871 B1 * | 1/2001 | Goestenkors et al. | 280/743.1 |
| 6,203,057 B1 | 3/2001 | Spencer et al. | |
| 6,213,497 B1 | 4/2001 | Spencer et al. | |
| 6,758,493 B2 | 7/2004 | Conlee et al. | |
| 6,817,627 B2 * | 11/2004 | Galmiche et al. | 280/730.1 |
| 7,125,045 B2 | 10/2006 | Fuks et al. | |
| 7,331,606 B2 | 2/2008 | Riefe et al. | |
| 7,762,577 B2 | 7/2010 | Kato et al. | |
| 8,205,909 B2 * | 6/2012 | Kalisz | 280/752 |
| 2004/0145163 A1 * | 7/2004 | Galmiche et al. | 280/730.1 |
| 2008/0061537 A1 * | 3/2008 | Enders | 280/730.1 |
| 2009/0152848 A1 | 6/2009 | Sadr et al. | |
| 2009/0152849 A1 | 6/2009 | Saraf et al. | |
| 2010/0194081 A1 * | 8/2010 | Thomas et al. | 280/730.1 |
| 2011/0012329 A1 * | 1/2011 | Sekino et al. | 280/730.2 |
| 2011/0018247 A1 | 1/2011 | Misikir et al. | |
| 2011/0115201 A1 | 5/2011 | Best et al. | |
| 2011/0198827 A1 * | 8/2011 | Roychoudhury | 280/730.2 |
| 2011/0272926 A1 * | 11/2011 | Roychoudhury et al. | 280/728.2 |
| 2012/0080871 A1 * | 4/2012 | Roychoudhury et al. | 280/742 |
| 2012/0248741 A1 * | 10/2012 | Kalisz | 280/728.2 |
| 2012/0267878 A1 * | 10/2012 | Kalisz et al. | 280/728.2 |

* cited by examiner

*Primary Examiner* — Paul N Dickson
*Assistant Examiner* — Keith Frisby
(74) *Attorney, Agent, or Firm* — Vichit Chea; MacMillan, Sobanski & Todd, LLC

(57) ABSTRACT

An active bolster for an automotive vehicle has an inflatable bladder formed by a reaction wall for mounting against a rigid structure of the vehicle and an expansion wall overlying the base wall. The base wall and expansion wall are comprised of molded plastic components. At least one of the reaction wall and the expansion wall includes a plurality of tether tabs, each tether tab having a contoured edge defining a movable flap. The contoured edge has first and second ends defining a first hinge axis and a pair of complementary undulations defining a second hinge axis substantially parallel to the first hinge axis. The movable flap has an attachment region joined to the other one of the reaction wall and the expansion wall, and the second hinge axis extends between the attachment region and the first hinge axis.

8 Claims, 4 Drawing Sheets

US 8,448,985 B2

ACTIVE BOLSTER WITH DOUBLE-HINGED TETHER TABS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to active bolsters for occupant crash protection in automotive vehicles, and, more specifically, to an inflatable bladder with internal tethers integrally formed as tear tabs on a bladder wall that limit the expansion of the bladder.

An active bolster is a type of vehicle occupant protection device with a gas-inflatable bladder to absorb impacts and reduce trauma to occupants during a crash. As opposed to deploying air bag cushions through various openings, active bolsters use the interior trim surface itself to expand at the beginning of a crash event for absorbing the impact and dissipating energy through the action of an inflation gas. Pending U.S. application Ser. No. 12/824,150, filed Jun. 26, 2010, incorporated herein by reference, discloses an active knee bolster integrated into a glove box door that is light weight and visually attractive.

In a typical structure, an active bolster includes a front wall or panel that faces a vehicle occupant and that is attached to a base wall (i.e., a reaction plate) along a sealed periphery. One or both of the walls is deformable in order to provide an inflatable bladder. The walls are initially spaced apart while in their non-inflated condition to allow ingress of the inflation gas in a manner that achieves even inflation across the panel.

The front and base walls of a typical active bolster are comprised of molded thermoplastics such as polyethylene, polyolefin, or PVC. They can be blow molded or injection molded. Pending application Ser. No. 12/824,150 discloses frangible tabs formed in the base wall having surfaces that are joined with the front wall. The tabs act as hinges that control the expansion of the bladder. In particular, the tabs restrict expansion beyond the length of the tabs (i.e., they act as a tether that results in a desired bolster surface location for cushioning an impact). Prior to deployment and tearing of the tether tabs, the attachment between the tabs and the front wall also help reduce the oil canning effect. Oil canning is the springing in and out of a flat panel perpendicular to the plane of the panel. In addition to a drum-like noise, oil canning is undesirable because it gives a perception of lack of structural quality and integrity. Furthermore, vibrations during operation of a vehicle may become concentrated at the bolster, thereby creating additional noise. Other non-hinged interconnections may also be included between the base and front walls that completely separate during deployment as described in pending U.S. application Ser. No. 13/075,294, filed Mar. 30, 2011, incorporated herein by reference. The non-hinged interconnections may be just for the purpose of reducing oil canning and are easily separated during inflation of the bladder by the expansion gas.

By integrally forming the tether tabs as portions of one of the walls, the tethering function is obtained at a low manufacturing cost. Due to the hinged movement of the tether tabs, however, expansion of the bladder is imparted with a rotational component. In a typical placement of an active bolster, it is preferable to expand the bladder perpendicular to the interior trim surface and toward the occupant. Thus, the rotational component may be undesirable. It would be desirable to reduce the rotational component of the expansion (i.e., provide translational movement instead of rotation) while maintaining the low manufacturing cost of tether tabs integrally formed by a portion of the bladder walls.

SUMMARY OF THE INVENTION

In one aspect of the invention, an active bolster for an automotive vehicle comprises a reaction wall for mounting against a rigid structure of the vehicle and an expansion wall overlying the base wall. The base wall and expansion wall are comprised of molded plastic components. At least one of the reaction wall and the expansion wall includes a plurality of tether tabs, each tether tab having a contoured edge defining a movable flap. The contoured edge has first and second ends defining a first hinge axis and a pair of complementary undulations defining a second hinge axis substantially parallel to the first hinge axis. The movable flap has an attachment region joined to the other one of the reaction wall and the expansion wall, and the second hinge axis extends between the attachment region and the first hinge axis.

DETAILED DESCRIPTION OF PREFERRED EMBODIMENTS

Figure 1:
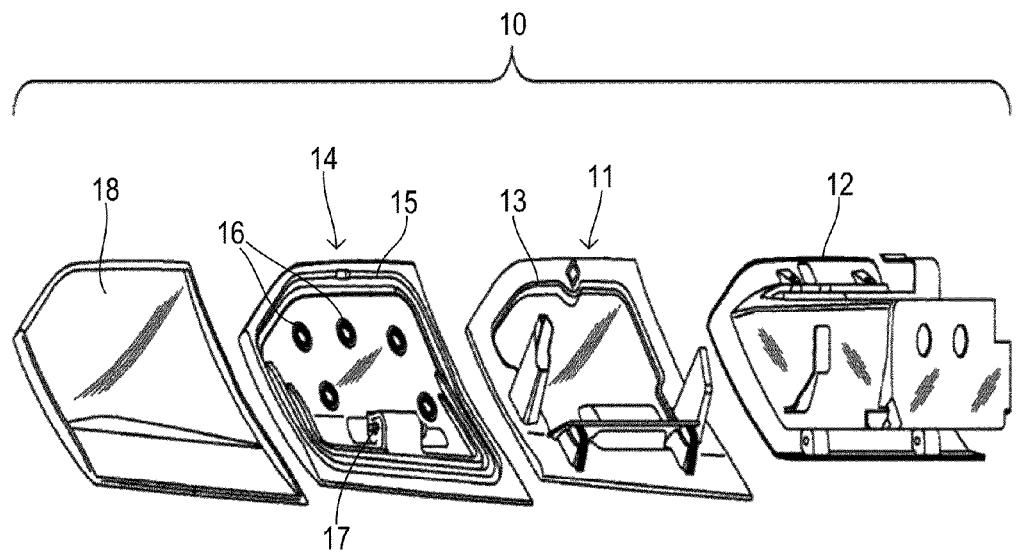
FIG. 1 is an outward-looking, exploded perspective view of an active knee bolster glove box door system of a type to which the present invention can be applied.

Referring now to FIG. 1, a prior art active knee bolster system 10 has a first panel component comprising a reaction wall 11. Reaction wall 11 may be either attached to the vehicle by hinging from a storage cavity or glove box 12 as shown in FIG. 1, or mounted to another structure such as an instrument panel support below a steering column or glove box, for example. Such locations are accessible to the knees of an individual riding in a corresponding seating position within a vehicle. The present invention can be utilized with a knee bolster or any other interior bolster such as a side impact bolster.

Figure 2:
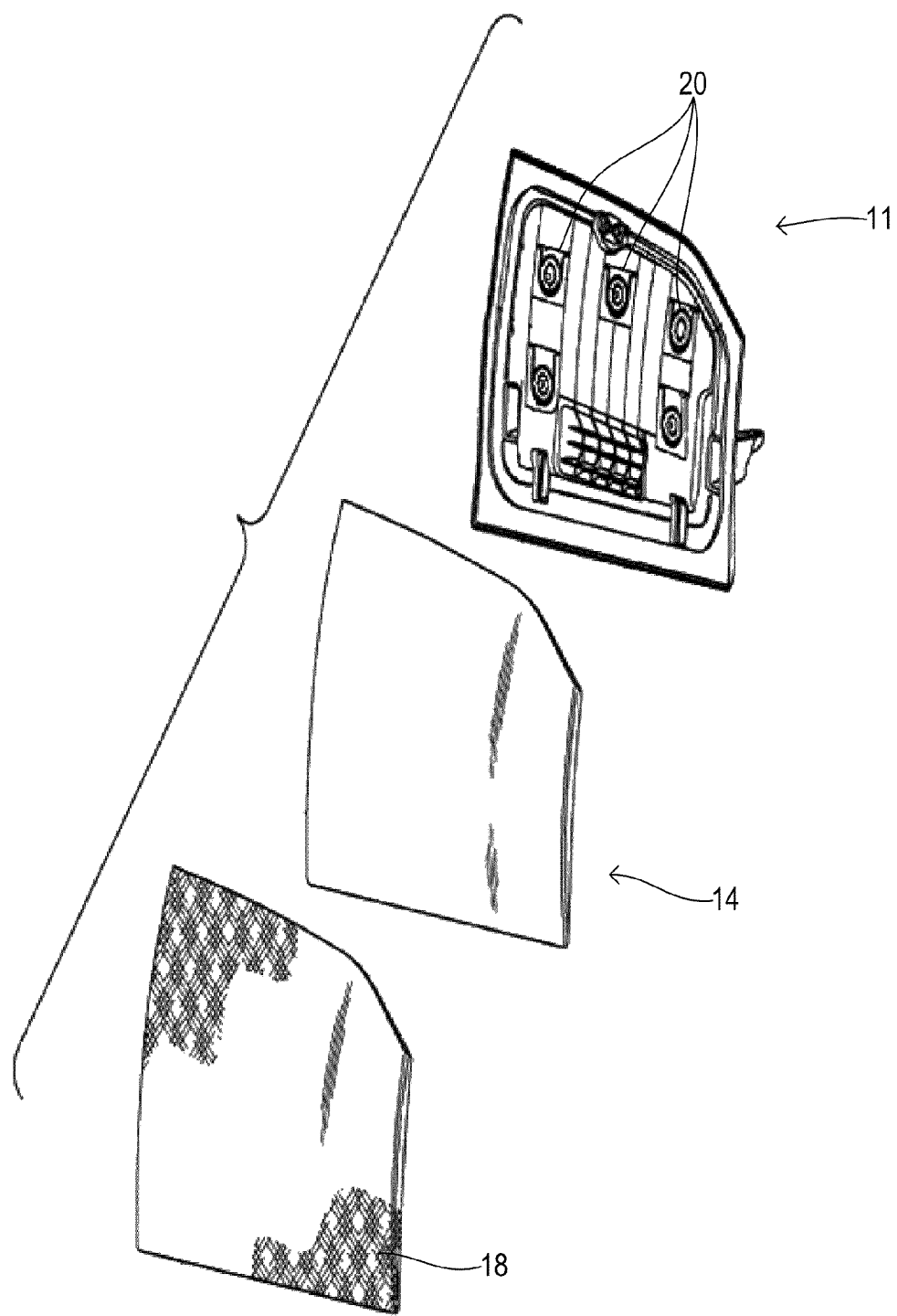
FIG. 2 is an inward-looking, exploded perspective view of the glove box door of FIG. 1.

Reaction wall 11 has a periphery 13 adapted to be sealed to a second panel component comprised of an expansion wall 14 that has a matching periphery 15. Reaction wall 11 and expansion wall 14 are preferably comprised of molded plastics and may be joined by plastic welding, such as hot plate welding, to form a peripheral seal around an interior open space for forming a bladder. They may also be formed by blow molding. Locating features 16 which may take the shape of raised bosses are provided on the inner surface of expansion wall 14 for joining with tether tabs 20 on the front surface of reaction wall 11 as shown in FIG. 2.

An inflation gas source 17 is mounted within the bladder and is electronically controlled for activating during a crash to release gas to inflate the bolster. Expansion wall 14 may comprise the interior trim surface (e.g., the outside of the glove box door), or an additional skin 18 can be applied to the outer surface (i.e., the Class A surface) of expansion wall 14. Skin 18 is preferably constructed of plastic and may be a vacuum-formed thermoplastic bilaminate that may be grained or otherwise finished.

Figure 3:
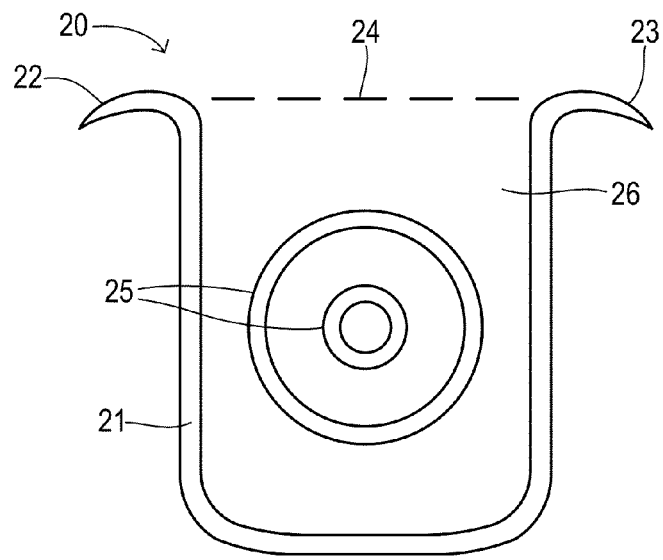
FIG. 3 is a front, plan view of a hinged tether tab.

An individual tether tab 20 is shown in greater detail in FIG. 3. A contoured edge 21 is formed by a thinned track in one of the walls (preferably the reaction wall), wherein contoured edge 21 is configured to tear during expansion of the expansion wall. The thinned portion may be molded into the wall or may be cut or etched into the wall after molding. Contoured edge 21 extends between a first end 22 and a second end 23. The ends are hook shaped to help prevent the tearing from extending beyond contoured edge 21.

Welding ribs 25 are provided on tether tab 20 for attachment to the expansion wall. As a result of separation between the reaction wall and expansion wall during inflation of the bladder, a flap 26 carrying ribs 25 is pulled forward to make a tear along contoured edge 21. Flap 26 rotates about a hinge axis 24 extending between ends 22 and 23.

Figure 4:
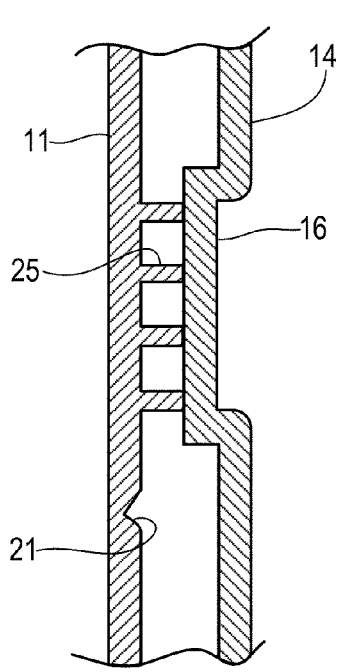
FIG. 4 is a side, cross-sectional view of the tether tab of FIG. 3 joined to an expansion wall prior to inflation.
Figure 5:
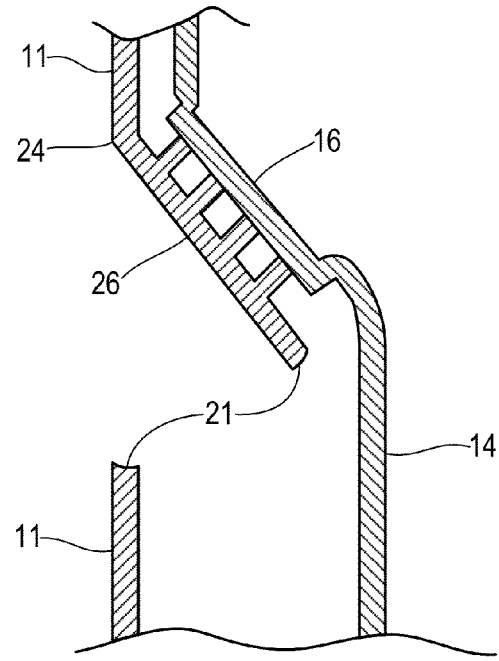
FIG. 5 is a side, cross-sectional view of the tether tab and expansion wall of FIG. 4 after inflation.

FIGS. 4 and 5 show the tethering function in greater detail. Prior to inflation as shown in FIG. 4, contoured edge 21 is untorn and walls 11 and 14 are in their original, substantially parallel configuration. After inflation as shown in FIG. 5, flap 26 has rotated around hinge axis 24 as a result of a tear along contoured edge 21. Correspondingly, expansion wall 14 has been rotated upward in FIG. 5 along with the expansion.

Figure 6:
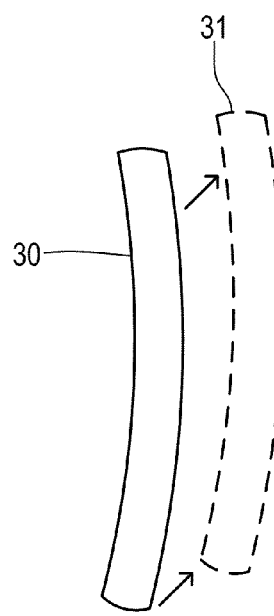
FIG. 6 shows an inflation profile of a bolster having tether tabs with a single hinge axis causing a rotational component.
Figure 7:
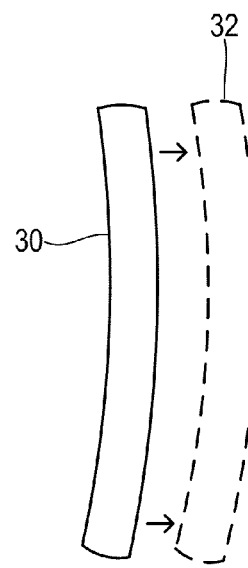
FIG. 7 shows a desired inflation profile of a bolster exhibiting outward translation with reduced rotation.

FIG. 6 shows a profile 30 of a bolster in solid lines as it would be prior to inflation. A dashed line 31 shows the expanded shape of the bolster including a rotational component of movement which may misalign the final position with that desired for absorbing an impact. FIG. 7 shows a dashed line 32 representing a desired bolster profile corresponding to outward translation and reduced rotation.

Figure 8:
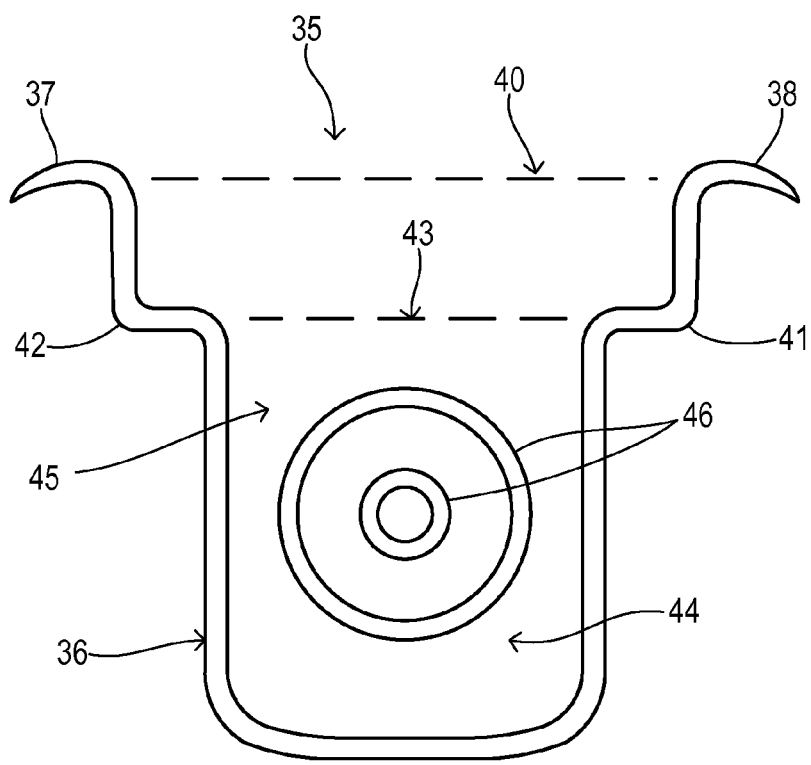
FIG. 8 is a front, plan view showing a tether tab with double hinge axes.
Figure 9:
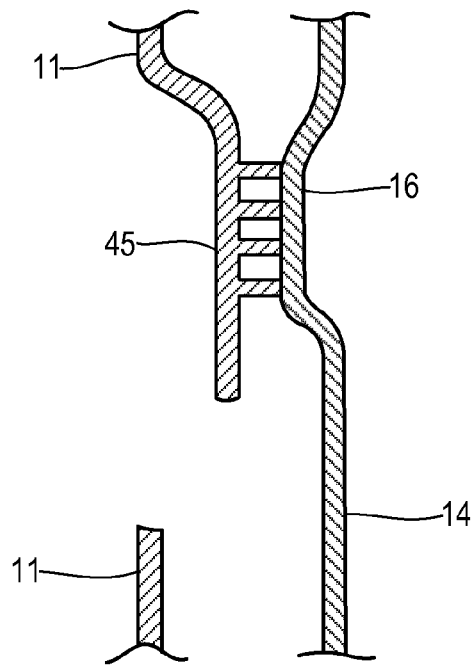
FIG. 9 is a side, cross-sectional view of the tether tab of FIG. 8 after inflation of the bladder.

The present invention reduces the rotational component of motion and increases the translational component with a modified contoured edge as shown in FIG. 8. A tether tab 35 formed in one of the reaction wall or expansion wall has a contoured edge 36. To form the contoured edge 36 as a tearable line or track around tether tab 35, the wall is either molded with a reduced thickness at contoured edge 36 or the wall may be scored or cut after molding. Contoured edge 36 extends between first and second hooked ends 37 and 38, thereby creating a first hinge axis 40. Contoured edge 36 follows a serpentine or zig-zag shape, including a pair of undulations 41 and 42 that are complementary or symmetrical to produce a second hinge axis 43. Hinge axis 43 is substantially parallel with hinge axis 40. Moreover, hinge axis 43 extends along a space between hinge axis 40 and an attachment region 44 of a flap 45 which provides attachment ribs 46. Preferably, the length of second hinge axis 43 is shorter than the length of first hinge axis 40. By providing a second hinge axis adapted to provide complementary or reverse pivoting with respect to the first hinge axis, a large portion of the rotational component of movement is converted into a translational component of movement. FIG. 9 illustrates the primarily translational movement of tether tab 35 and expansion wall 14 using a compound contoured edge of the present invention.

What is claimed is:

1. An active bolster for an automotive vehicle, comprising:
   a reaction wall for mounting against a rigid structure of the vehicle; and
   an expansion wall overlying the reaction wall;
   wherein the reaction wall and expansion wall are comprised of molded plastic components; and
   wherein at least one of the reaction wall and the expansion wall includes a plurality of tether tabs, each tether tab having a contoured edge defining a movable flap, the contoured edge having first and second ends defining a first hinge axis, the contoured edge having a pair of complementary undulations defining a second hinge axis substantially parallel to the first hinge axis, wherein the movable flap has an attachment region joined to the other one of the reaction wall and the expansion wall, and wherein the second hinge axis extends between the attachment region and the first hinge axis.

2. The active bolster of claim 1 wherein the contoured edge has a serpentine shape wherein the second hinge axis is shorter than the first hinge axis.

3. The active bolster of claim 1 wherein the contoured edge is comprised of a thinned track formed in the one wall and configured to tear during expansion of the expansion wall.

4. The active bolster of claim 1 wherein the contoured edge includes first and second hook stops formed at the first and second ends, respectively.

5. The active bolster of claim 1 wherein the reaction wall and the expansion wall are comprised of respective injection molded panels that are joined at a periphery defining an inflatable bladder.

6. The active bolster of claim 1 wherein the reaction wall and the expansion wall comprise a door of a storage compartment.

7. The active bolster of claim 1 further comprising:
   a skin overlying the expansion wall providing a Class A surface of an interior of the vehicle.

8. An active bolster comprising:
   a reaction wall;
   an expansion wall;
   the walls forming a plurality of internal tethers each comprising a contoured edge defining a tearable flap and having first and second ends defining a first hinge axis, an attachment region in the flap joining the walls, and a pair of complementary undulations defining a second hinge axis substantially parallel to the first hinge axis and between the first hinge axis and the attachment region.

* * * * *